(12) United States Patent
Uesaka et al.

(10) Patent No.: US 8,686,085 B2
(45) Date of Patent: Apr. 1, 2014

(54) RUBBER COMPOSITION AND PNEUMATIC TIRE

(75) Inventors: Kenichi Uesaka, Kobe (JP); Toshiro Matsuo, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 250 days.

(21) Appl. No.: 12/511,766

(22) Filed: Jul. 29, 2009

(65) Prior Publication Data

US 2010/0084065 A1 Apr. 8, 2010

(30) Foreign Application Priority Data

Oct. 8, 2008 (JP) ................................ 2008-261915

(51) Int. Cl.
*C08K 3/34* (2006.01)
*B60C 5/00* (2006.01)

(52) U.S. Cl.
USPC .......................................... 524/493; 152/450

(58) Field of Classification Search
USPC ........................................................ 524/493
See application file for complete search history.

(56) References Cited

U.S. PATENT DOCUMENTS

| | | | | |
|---|---|---|---|---|
| 4,908,401 | A | | 3/1990 | Ohara et al. |
| 6,294,624 | B1 * | | 9/2001 | Inoue et al. ................ 526/93 |
| 7,487,572 | B2 * | | 2/2009 | Nelson ....................... 16/334 |
| 2005/0234165 | A1 * | | 10/2005 | Schaal et al. ............... 524/210 |
| 2010/0006199 | A1 * | | 1/2010 | Ohta et al. ................. 152/522 |
| 2010/0071827 | A1 * | | 3/2010 | Miyazaki .................... 152/565 |

FOREIGN PATENT DOCUMENTS

| | | |
|---|---|---|
| EP | 1 022 291 A1 | 7/2000 |
| EP | 1 882 716 A1 | 1/2008 |
| EP | 1 914 245 A1 | 4/2008 |
| EP | 1 958 984 A1 | 8/2008 |
| EP | 2 090 615 A1 | 8/2009 |
| EP | 2 251 374 A1 | 11/2010 |
| JP | 2003-192842 A | 7/2003 |
| JP | 2007-321041 A | 12/2007 |
| JP | 2007321041 A * | 12/2007 |
| JP | 2008-214608 A | 9/2008 |

OTHER PUBLICATIONS

Uedono et al., Journal of Polymer Science: Part B: Polymer Physics, vol. 39, 835-842 (2001).*

Uedono et al., Journal of Polymer Science: Part B: Polymer Physics, vol. 39, 835-842, 2001.*

* cited by examiner

*Primary Examiner* — Hui Chin
(74) *Attorney, Agent, or Firm* — Birch, Stewart, Kolasch & Birch, LLP

(57) ABSTRACT

The present invention has its object to provide a rubber composition having excellent low-exothermic property and high strength together, and a pneumatic tire produced using the rubber composition. The present invention relates to a rubber composition which contains a rubber component and 10 to 150 parts by mass of silica per 100 parts by mass of the rubber component. The rubber component contains a butadiene rubber modified by a compound represented by the formula (1):

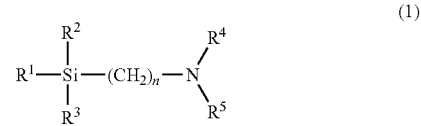

wherein, $R^1$, $R^2$ and $R^3$ are the same or different and independently represent an alkyl group, an alkoxy group, a silyloxy group, an acetal group, a carboxyl group, a mercapto group, or a derivative thereof; $R^4$ and $R^5$ are the same or different and independently represent a hydrogen atom or an alkyl group; and n represents an integer.

9 Claims, No Drawings

RUBBER COMPOSITION AND PNEUMATIC TIRE

TECHNICAL FIELD

The present invention relates to a rubber composition and a pneumatic tire.

BACKGROUND ART

Many studies have conventionally been made to reduce fuel consumption by reducing rolling resistance (expressed also as "by improving rolling resistance performance") of tires. For example, treads of tires are formed in a two-layer structure (an inner layer and a surface layer), and a base tread of the inner layer is made of a rubber composition having excellent low-exothermic property. Further reduction in fuel consumption has been more and more strongly required in recent years, however, and a rubber composition for a tread among various components in a tire, which occupies a large portion of a tire, is required to have more excellent low-exothermic property.

Known as a method for imparting sufficient low-exothermic property to a rubber composition for a tread is a method in which an amount of a reinforcing filler in the rubber composition is reduced. In such a case, however, hardness of the rubber composition decreases and thereby the tires obtained are softened, which disadvantageously causes decrease in handling performance (handling stability) and wet-skid resistance of automobiles and causes decrease in abrasion resistance of the tires.

Conventionally, a rubber composition, which contains butadiene rubber for improving flex crack resistance and carbon black for improving weather resistance and a reinforcing property in addition to a natural rubber having excellent tear strength, has been used as a rubber composition for a sidewall of a tire. As mentioned above, however, the further reduction in fuel consumption has been more and more strongly required, so that not only a tread but also a sidewall is required to have improved rolling resistance performance.

For reducing rolling resistance of a sidewall, a method in which a content of a reinforcing filler is reduced has been known as well as for a tread. Unfortunately, however, strength of a rubber composition decreases and thereby the tire obtained becomes susceptible to damage.

A natural rubber is used in various tire components because it has high mechanical strength and excellent abrasion resistance. In the case of the natural rubber, however, reversion owing to over-vulcanization tends to occur and, disadvantageously, fuel consumption may easily increase. For inhibiting reversion and improving heat resistance of vulcanizable rubber compositions used in rubber products such as tires, a technique in which a blending amount of a vulcanization accelerator is increased relative to an amount of sulfur as a vulcanizing agent, a technique in which a thiuram-type vulcanization accelerator is blended as a vulcanization accelerator, and other techniques have been conventionally known.

It also has been known that reversion of a rubber composition can be inhibited by blending, in the rubber composition, a crosslinking agent capable of forming a long chain crosslinking structure represented by —$(CH_2)_6$—S—. With respect to the crosslinking agent, PERKALINK 900 and Duralink HTS (each produced by Flexsys), and Vulcuren KA9188 (produced by Bayer AG) are known. Such a technique can inhibit reversion; however, fuel consumption increases and mechanical strength decreases, which disadvantageously causes deterioration of balance of performances.

Patent Document 1 discloses a rubber composition for a tire containing anhydrous silica and hydrous silica together for the purpose of improving wet-skid resistance without decreasing abrasion resistance and increasing fuel consumption. However, there is still a room for improvement in low-exothermic property.

Patent Document 1: JP 2003-192842 A

SUMMARY OF THE INVENTION

The present invention has its object to provide a rubber composition which solves the above problems and which has excellent low-exothermic property and high strength together, and a pneumatic tire produced using the rubber composition.

The present invention relates to a rubber composition which includes a rubber component and 10 to 150 parts by mass of silica per 100 parts by mass of the rubber component. The rubber component contains a butadiene rubber modified by a compound represented by the formula (1):

$$R^1-\underset{\underset{R^3}{|}}{\overset{\overset{R^2}{|}}{Si}}-(CH_2)_n-N\underset{R^5}{\overset{R^4}{\diagup}} \qquad (1)$$

wherein, $R^1$, $R^2$ and $R^3$ are the same or different and independently represent an alkyl group, an alkoxy group, a silyloxy group, an acetal group, a carboxyl group, a mercapto group, or a derivative thereof; $R^4$ and $R^5$ are the same or different and independently represent a hydrogen atom or an alkyl group; and n represents an integer.

Desirably, the rubber composition further includes 1 to 8 parts by mass of a mixture of a zinc salt of an aliphatic carboxylic acid and a zinc salt of an aromatic carboxylic acid per 100 parts by mass of the rubber component.

The vinyl content in the modified butadiene rubber is desirably 35% by mass or less.

The rubber composition is desirably used as a rubber composition for a base tread or a sidewall.

The present invention also relates to a pneumatic tire which is produced using the above-mentioned rubber composition.

According to one aspect of the present invention, the present invention relates to a rubber composition which contains a rubber component and 10 to 150 parts by mass of silica per 100 parts by mass of the rubber component, the rubber component containing a butadiene rubber modified by a specific compound. Thus, by preparing tire components such as a base tread and a sidewall with use of the rubber composition, it is possible to provide a pneumatic tire having excellent low-exothermic property and high strength together.

BEST MODE FOR CARRYING OUT THE INVENTION

The rubber composition of the present invention contains a rubber component and 10 to 150 parts by mass of silica per 100 parts by mass of the rubber component. The rubber component to be blended in the rubber composition contains a butadiene rubber modified by a compound represented by the above formula (1) (a modified butadiene rubber). The rubber composition containing the modified butadiene rubber and the silica can have excellent low-exothermic property while maintaining high rubber strength.

In the compound represented by the formula (1), $R^1$, $R^2$ and $R^3$ are the same or different and independently represent an alkyl group, an alkoxy group, a silyloxy group, an acetal group, a carboxyl group (—COOH), a mercapto group (—SH), or a derivative thereof. Examples of the alkyl group include $C_{1-4}$ alkyl groups such as a methyl group, an ethyl group, an n-propyl group, an isopropyl group, an n-butyl group, and a t-butyl group. Examples of the alkoxy group include $C_{1-8}$ (desirably $C_{1-6}$, and more desirably $C_{1-4}$) alkoxy groups such as a methoxy group, an ethoxy group, an n-propoxy group, an isopropoxy group, an n-butoxy group, and a t-butoxy group. The alkoxy group also includes cycloalkoxy groups (for example, $C_{5-8}$ cycloalkoxy groups such as a cyclohexyloxy group), and aryloxy groups (for example, $C_{6-8}$ aryloxy groups such as a phenoxy group and a benzyloxy group).

Examples of the silyloxy group include silyloxy groups with substitution of a $C_{1-20}$ aliphatic group or aromatic group (such as a trimethylsilyloxy group, a triethylsilyloxy group, a triisopropylsilyloxy group, a diethylisopropylsilyloxy group, a t-butyldimethylsilyloxy group, a t-butyldiphenylsilyloxy group, a tribenzylsilyloxy group, a triphenylsilyloxy group, and a tri-p-xylylsilyloxy group).

Examples of the acetal group include groups represented by formulae such as —C(RR')—OR" and —O—C(RR')—OR". Examples of the groups represented by the former formula include a methoxymethyl group, an ethoxymethyl group, a propoxymethyl group, a butoxymethyl group, an isopropoxymethyl group, a t-butoxymethyl group, and a neopentyloxymethyl group. Examples of the groups represented by the latter formula include a methoxymethoxy group, an ethoxymethoxy group, a propoxymethoxy group, an i-propoxymethoxy group, an n-butoxymethoxy group, a t-butoxymethoxy group, an n-pentyloxymethoxy group, an n-hexyloxymethoxy group, a cyclopentyloxymethoxy group, and a cyclohexyloxymethoxy group. Each of $R^1$, $R^2$ and $R^3$ is desirably an alkoxy group, and thereby low-exothermic property and high rubber strength can be favorably achieved together.

With respect to the alkyl group as $R^4$ or $R^5$, the same alkyl groups as those mentioned above can be exemplified.

The n (integer) is desirably 1 to 5, and thereby low-exothermic property and high rubber strength can be favorably achieved together. The n is more desirably 2 to 4, and most desirably 3. If the n is 0, a difficulty may be caused in bonding between a silicon atom and a nitrogen atom. If the n is 6 or more, the efficacy of the compound as a modifying agent may weaken.

Specific examples of the compound represented by the formula (1) include 3-aminopropyldimethylmethoxysilane, 3-aminopropylmethyldimethoxysilane, 3-aminopropylethyldimethoxysilane, 3-aminopropyltrimethoxysilane, 3-aminopropyldimethylethoxysilane, 3-aminopropylmethyldiethoxysilane, 3-aminopropyltriethoxysilane, 3-aminopropyldimethylbutoxysilane, 3-aminopropylmethyldibutoxysilane, dimethylaminomethyltrimethoxysilane, 2-dimethylaminoethyltrimethoxysilane, 3-dimethylaminopropyltrimethoxysilane, 4-dimethylaminobutyltrimethoxysilane, dimethylaminomethyldimethoxymethylsilane, 2-dimethylaminoethyldimethoxymethylsilane, 3-dimethylaminopropyldimethoxymethylsilane, 4-dimethylaminobutyldimethoxymethylsilane, dimethylaminomethyltriethoxysilane, 2-dimethylaminoethyltriethoxysilane, 3-dimethylaminopropyltriethoxysilane, 4-dimethylaminobutyltriethoxysilane, dimethylaminomethyldiethoxymethylsilane, 2-dimethylaminoethyldiethoxymethylsilane, 3-dimethylaminopropyldiethoxymethylsilane, 4-dimethylaminobutyldiethoxymethylsilane, diethylaminomethyltrimethoxysilane, 2-diethylaminoethyltrimethoxysilane, 3-diethylaminopropyltrimethoxysilane, 4-diethylaminobutyltrimethoxysilane, diethylaminomethyldimethoxymethylsilane, 2-diethylaminoethyldimethoxymethylsilane, 3-diethylaminopropyldimethoxymethylsilane, 4-diethylaminobutyldimethoxymethylsilane, diethylaminomethyltriethoxysilane, 2-diethylaminoethyltriethoxysilane, 3-diethylaminopropyltriethoxysilane, 4-diethylaminobutyltriethoxysilane, diethylaminomethyldiethoxymethylsilane, 2-diethylaminoethyldiethoxymethylsilane, 3-diethylaminopropyldiethoxymethylsilane, and 4-diethylaminobutyldiethoxymethylsilane. Each of these may be used singly, or two or more of these may be used in combination.

With respect to a method for modifying butadiene rubber by the compound (modifying agent) represented by the formula (1), conventionally known methods such as the methods disclosed in, for example, JP H06-53768 B and JP H06-57767 B may be used. What is required for the modification method is, for example, to allow butadiene rubber to contact a modifying agent; there may be mentioned, for instance, a method in which butadiene rubber is polymerized and a modifying agent is added in a predetermined amount into the polymerized rubber solution, a method in which a modifying agent is added into a butadiene rubber solution to react with each other, and like methods.

The butadiene rubber (BR) to be modified is not particularly limited. Examples thereof include: BRs with a high cis-content such as BR1220 (produced by ZEON Corp.), BR130B and BR150B (each produced by UBE INDUSTRIES, LTD.); and syndiotactic polybutadiene crystal-containing BRs such as VCR412 and VCR617 (each produced by UBE INDUSTRIES, LTD.).

The vinyl content in the modified butadiene rubber is desirably 35% by mass or less, more desirably 25% by mass or less, and still more desirably 20% by mass or less. If the vinyl content is more than 35% by mass, low-exothermic property tends to deteriorate. The lower limit of the vinyl content is not particularly restricted.

The vinyl content (1,2-bond content in butadiene unit) can be measured by an infrared absorption spectrum analysis.

The amount of the modified butadiene rubber in 100% by mass of the rubber component is desirably 10% by mass or more, and more desirably 15% by mass or more. If the amount thereof is less than 10% by mass, low-exothermic property may not be sufficiently exerted. The upper limit of the amount of the modified butadiene rubber is not particularly limited, but is desirably 90% by mass or less, and more desirably 80% by mass or less. If the amount thereof is more than 90% by mass, rubber strength tends to be insufficient.

With respect to other rubber materials than the modified butadiene rubber to be used for the rubber composition, diene-type rubbers can be exemplified. Examples of the diene-type rubbers include natural rubbers (NRs), epoxydized natural rubbers (ENRs), butadiene rubber (BR), styrene-butadiene rubber (SBR), isoprene rubber (IR), ethylene-propylene-diene rubber (EPDM), butyl rubber (IIR), halogenated butyl rubbers (X-IIRs), chloroprene rubber (CR), acrylonitrile-butadiene rubber (NBR), and halogenated copolymers of an isomonoolefin and a paraalkylstyrene. Particularly, the natural rubber is desirably used in combination with the modified butadiene rubber from the viewpoint of strength improvement.

The NRs are not particularly limited. For example, natural rubbers generally used in the tire industry, such as SIR20, RSS#3, and TSR20, may be used.

The amount of a natural rubber in 100% by mass of the rubber component is desirably 20% by mass or more, and more desirably 30% by mass or more. If the amount thereof is less than 20% by mass, strength tends to decrease. The amount of the natural rubber is desirably 90% by mass or less, and more desirably 80% by mass or less. If the amount thereof is more than 90% by mass, flex crack growth resistance tends to deteriorate.

The rubber composition contains silica. Containing silica and the modified butadiene rubber together makes it possible to achieve good low-exothermic property and high rubber strength. The silica is not particularly limited. Examples thereof include dry silica (silicic anhydride) and wet silica (hydrous silicic acid). The wet silica is desirable because it has more silanol groups.

The average primary particle diameter of the silica is desirably 10 nm or more, and more desirably 15 nm or more. If the average primary particle diameter thereof is less than 10 nm, low-exothermic property and rubber processability tend to be poor. The average primary particle diameter of the silica is desirably 40 nm or less, and more desirably 30 nm or less. If the average primary particle diameter thereof is more than 40 nm, breaking strength tends to decrease. The average primary particle diameter of the silica may be determined, for example, as follows: observing silica with an electron microscope; measuring particle diameters of any 50 particles thereof; and averaging the particle diameters.

The amount of the silica is 10 parts by mass or more, and desirably 20 parts by mass or more, per 100 parts by mass of the rubber component. If the amount of the silica is less than 10 parts by mass, effects of blending the silica cannot be sufficiently exerted. The amount of the silica is 150 parts by mass or less, and desirably 120 parts by mass or less, per 100 parts by mass of the rubber component. If the amount of the silica is more than 150 parts by mass, it will be difficult to disperse silica in the rubber component, which results in poor rubber processability.

The rubber composition desirably contains a silane coupling agent. Any silane coupling agents conventionally used in combination with silica in the rubber industry can be used. Examples thereof include: sulfide-type silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazol tetrasulfide, 3-triethoxysilylpropylmethacrylate monosulfide, and 3-trimethoxysilylpropylmethacrylate monosulfide; mercapto-type silane coupling agents such as 3-mercaptopropyl trimethoxysilane, 3-mercaptopropyl triethoxysilane, 2-mercaptoethyl trimethoxysilane, and 2-mercaptoethyl triethoxysilane; vinyl-type silane coupling agents such as vinyl triethoxysilane and vinyl trimethoxysilane; glycidoxy-type silane coupling agents such as γ-glycidoxypropyl triethoxysilane, γ-glycidoxypropyl trimethoxysilane, γ-glycidoxypropyl methyldiethoxysilane, and γ-glycidoxypropyl methyldimethoxysilane; nitro-type silane coupling agents such as 3-nitropropyl trimethoxysilane and 3-nitropropyl triethoxysilane; and chloro-type silane coupling agents such as 3-chloropropyl trimethoxysilane, 3-chloropropyl triethoxysilane, 2-chloroethyl trimethoxysilane, and 2-chloroethyl triethoxysilane. As the trade name thereof, Si69, Si75, and Si363 (each produced by Degussa AG), NXT, NXT-LV, NXT-ULV, and NXT-Z (each produced by GE), and the like are listed. Desirable among these is bis(3-triethoxysilylpropyl)disulfide. Each of these silane coupling agents may be used singly or two or more of these may be used in combination.

The amount of the silane coupling agent is desirably 5 parts by mass or more, and more desirably 8 parts by mass or more, per 100 parts by mass of the silica. If the amount thereof is less than 5 parts by mass, breaking strength tends to decrease greatly. The amount of the silane coupling agent is desirably 15 parts by mass or less, and more desirably 10 parts by mass or less, per 100 parts by mass of the silica. If the amount thereof is more than 15 parts by mass, effects of adding the silane coupling agent, such as increase in breaking strength and decrease in rolling resistance, tend not to be exerted.

Desirably, the rubber composition further contains a mixture of a zinc salt of an aliphatic carboxylic acid and a zinc salt of an aromatic carboxylic acid. The zinc salts are particularly effective for inhibiting reversion of butadiene rubber, and can improve processability of the silica-blended composition; thus, reversion of the silica-blended composition can be effectively inhibited Such inhibition of reversion makes it possible to achieve good fuel economy.

Examples of the aliphatic carboxylic acid include: aliphatic carboxylic acids derived from vegetable oils such as coconut oil, palm kernel oil, camellia oil, olive oil, almond oil, canola oil, peanut oil, rice bran oil, cacao butter, palm oil, soybean oil, cottonseed oil, sesame oil, linseed oil, castor oil and rapeseed oil; aliphatic carboxylic acids derived from animal oils such as beef tallow; and aliphatic carboxylic acids chemically synthesized from petroleum or the like materials. The vegetable oil-derived aliphatic carboxylic acids are desirable because they are environment-friendly, and it is possible to prepare for a future decrease in oil supply, and to inhibit reversion sufficiently. The aliphatic carboxylic acid derived from coconut oil, palm kernel oil, or palm oil is more desirable.

The carbon number of the aliphatic carboxylic acid is desirably 4 or more, and more desirably 6 or more. If the carbon number of the aliphatic carboxylic acid is less than 4, its dispersibility tends to deteriorate. The carbon number of the aliphatic carboxylic acid is desirably 16 or less, more desirably 14 or less, and still more desirably 12 or less. If the carbon number of the aliphatic carboxylic acid is more than 16, reversion tends not to be sufficiently inhibited.

The aliphatic group in the aliphatic carboxylic acid may be one having a chain structure such as an alkyl group or one having a ring structure such as a cycloalkyl group.

Examples of the aromatic carboxylic acid include benzoic acid, phthalic acid, mellitic acid, hemimellitic acid, trimellitic acid, diphenic acid, toluic acid, and naphthoic acid. In view of sufficient inhibition of reversion, benzoic acid, phthalic acid, or naphthoic acid is particularly desirable.

The content ratio of the zinc salt of the aliphatic carboxylic acid and the zinc salt of the aromatic carboxylic acid in the mixture [molar ratio: (zinc salt of aliphatic carboxylic acid)/(zinc salt of aromatic carboxylic acid), hereinafter referred to as "the content ratio"] is desirably 1/20 or more, more desirably 1/15 or more, and still more desirably 1/10 or more. If the content ratio thereof is less than 1/20, it may be impossible to be environment-friendly and to prepare for a future decrease in oil supply, and, further, the dispersibility and stability of the mixture tend to deteriorate. The content ratio thereof is desirably 20/1 or less, more desirably 15/1 or less, and still more desirably 10/1 or less. If the content ratio thereof is more than 20/1, inhibition of reversion tends to be insufficient.

Zinc content in the mixture is desirably 3% by mass or more, and more desirably 5% by mass or more. If the zinc content in the mixture is less than 3% by mass, inhibition of reversion tends to be insufficient. The zinc content in the mixture is desirably 30% by mass or less, and more desirably 25% by mass or less. If the zinc content in the mixture is more than 30% by mass, processability tends to deteriorate and the cost unnecessarily increases.

The amount of the mixture is desirably 1 part by mass or more, more desirably 2 parts by mass or more, and still more desirably 3 parts by mass or more, per 100 parts by mass of the rubber component. If the amount of the mixture is less than 1 part by mass, inhibition of reversion may be insufficient, so that it is difficult to achieve a sufficient improvement. The amount of the mixture is desirably 8 parts by mass or less, more desirably 7 parts by mass or less, and still more desirably 5 parts by mass or less. If the amount of the mixture is more than 8 parts by mass, blooming is more likely to occur and smaller effects may be exerted relative to the addition amount of the mixture; thus, the cost unnecessarily increases.

The rubber composition may contain carbon black. The carbon black improves rubber strength. Examples of the carbon black include GPF, HAF, ISAF, and SAF.

In the case of using the carbon black, the nitrogen adsorption specific surface area ($N_2SA$) of the carbon black is desirably 30 $m^2/g$ or more, and more desirably 70 $m^2/g$ or more. If the $N_2SA$ is less than 30 $m^2/g$, reinforcing property provided by the carbon black tends to be insufficient. The $N_2SA$ of the carbon black is desirably 250 $m^2/g$ or less, and more desirably 150 $m^2/g$ or less. If the $N_2SA$ is more than 250 $m^2/g$, viscosity before vulcanization may be very high and thereby processability tends to deteriorate, or fuel consumption tends to increase. The nitrogen adsorption specific surface area of the carbon black is determined by the method A in JIS K 6217-7.

The amount of the carbon black is desirably 10 parts by mass or more, and more desirably 20 parts by mass or more, per 100 parts by mass of the rubber component. If the amount thereof is less than 10 parts by mass, reinforcing property provided by the carbon black tends to be insufficient. The amount of the carbon black is desirably 60 parts by mass or less, and more desirably 50 parts by mass or less, per 100 parts by mass of the rubber component. If the amount thereof is more than 60 parts by mass, much heat tends to be generated.

In addition to the rubber component such as the modified butadiene rubber, the silica, the silane coupling agent, the mixture of a zinc salt of an aliphatic carboxylic acid and a zinc salt of an aromatic carboxylic acid, and the carbon black as mentioned above, the rubber composition of the present invention may optionally contain a compounding ingredient commonly used in production of rubber compositions. Examples of the compounding ingredient include: reinforcing fillers such as clay; zinc oxide; stearic acid; various antiaging agents; oils such as aromatic oils; waxes; vulcanizing agents such as sulfur; and vulcanization accelerators.

The rubber composition of the present invention may be produced by a known method. For example, the rubber composition may be produced by kneading the above ingredients with a rubber kneader such as an open roll mill or a Banbury mixer, and then vulcanizing the mixture.

The rubber composition of the present invention can be used as a rubber composition for respective components of a tire. Particularly, the rubber composition can be suitably used for a base tread and a sidewall. Examples of the base tread include a base tread that is a part of a two-layer tire tread including a cap tread and a base tread, and like base treads.

The pneumatic tire of the present invention can be produced by a usual method with use of the above rubber composition. More specifically, the rubber composition of the present invention prepared by mixing the aforementioned compounding ingredients according to necessity is extruded and processed into a shape of each of tire components such as a base tread and a sidewall at an unvulcanized stage and then, laminated with other tire components on a tire molding machine and molded in a usual manner to obtain an unvulcanized tire. Then, the unvulcanized tire is subjected to heating and pressing in a vulcanizer to obtain the tire of the present invention.

There is particularly no limitation of automobiles to which the pneumatic tire of the present invention can be applied.

EXAMPLES

The present invention will be more specifically described based on examples, but the present invention is not limited to these examples.

In the following, respective chemical agents used in Examples and Comparative Examples are listed.

NR (1): RSS#3

NR (2): TSR20

Butadiene rubber (BR (1)): Nipol BR1220 produced by ZEON Corp. (vinyl content: 1% by mass, not modified)

Butadiene rubber (BR (2)): modified butadiene rubber produced by Sumitomo Chemical Co., Ltd. (vinyl content: 15% by mass, $R^1$, $R^2$ and $R^3$=—$OCH_3$; $R^4$ and $R^5$=—$CH_2CH_3$; n=3)

Mixture: Activator 73A produced by Struktol ((i) zinc salt of aliphatic carboxylic acid: zinc salt of coconut oil-derived fatty acid ($C_{8-12}$), (ii) zinc salt of aromatic carboxylic acid: zinc benzoate, molar content ratio: 1/1, zinc content: 17% by mass)

Carbon black (1): SHOBLACK N330 produced by Showa Cabot K.K. ($N_2SA$: 79 $m^2/g$)

Carbon black (2): SEAST NH produced by Tokai Carbon Co., Ltd. ($N_2SA$: 74 $m^2/g$)

Silica: ULTRASIL VN3 produced by Degussa AG (average primary particle diameter: 15 nm)

Silane coupling agent: Si75 produced by Degussa-Huels AG (bis(3-triethoxysilylpropyl)disulfide)

Zinc oxide: Zinc white #1 produced by MITSUI MINING & SMELTING CO., LTD.

Stearic acid: Stearic acid "TSUBAKI" produced by NOF Corp.

Aromatic oil: Process X-140 produced by JAPAN ENERGY CORP.

Antiaging agent: Antigene 6C produced by Sumitomo Chemical Co., Ltd.

N-(1,3-dimethylbutyl)-N'-phenyl-p-phenylenediamine

Wax: Sunnoc N produced by OUCHI SHINKO CHEMICAL INDUSTRIAL CO., LTD.

Sulfur: sulfur powder produced by Karuizawa Iou Kabushikikaisya

Vulcanization accelerator (1): NOCCELER CZ produced by OUCHI SHINKO CHEMICAL INDUSTRIAL CO., LTD.

N-cyclohexyl-2-benzothiazolylsulfenamide

Vulcanization accelerator (2): NOCCELER D produced by OUCHI SHINKO CHEMICAL INDUSTRIAL CO., LTD.

N,N'-diphenylguanidine

Examples 1 to 14 and Comparative Examples 1 to 16

According to the respective formulations shown in Tables 1 to 4, chemical agents other than sulfur and a vulcanization accelerator were kneaded for four minutes by a Banbury mixer to provide a kneaded product. To the resulting kneaded product were added sulfur and a vulcanization accelerator and then kneaded with an open roll mill for four minutes to provide an unvulcanized rubber composition. Thereafter, the resulting unvulcanized rubber composition was press-vulcanized at 170° C. for 12 minutes to provide a vulcanized rubber composition (a vulcanized rubber sheet).

The vulcanized rubber sheets obtained above were individually evaluated based on the following criteria. Tables 1 to 4 illustrate the results.

(Viscoelasticity Test)

The vulcanized rubber sheet was subjected to thermal-oxidative aging at 170° C. for 12 minutes. Then, loss tangent (tan δ) of the vulcanized rubber sheet was measured at 30° C. by a viscoelasticity spectrometer (produced by Iwamoto Seisakusho Co., Ltd.) under conditions of: 10 Hz in frequency; 10% in initial strain; and 2% in dynamic strain. The low-exothermic property index value of each of Comparative Example 1 (Table 1), Comparative Example 8 (Table 2), Comparative Example 15 (Table 3), and Comparative Example 16 (Table 4) was regarded as 100, and the tan δ of each of the vulcanized compositions was expressed as an index value calculated by the following equation. The larger index value of low-exothermic property means the less heat generation and the more excellent low-exothermic property.

(Low-exothermic property Index)=(tan δ value of Comparative Example 1, 8, 15 or 16)/(tan δ value of each of the vulcanized compositions)×100

(Tensile Test)

A No. 3 dumbbell specimen prepared from the vulcanized rubber sheet was subjected to tensile tests in accordance with JIS K 6251 "Rubber, vulcanized or thermoplastic—Determination of tensile stress—strain properties". Tensile strength at break (TB) and elongation at break (EB) were measured and breaking energy (TB×EB/2) was then calculated therefrom. The strength index value of each of Comparative Example 1 (Table 1), Comparative Example 8 (Table 2), Comparative Example 15 (Table 3), and Comparative Example 16 (Table 4) was regarded as 100, and the breaking energy of each of the vulcanized compositions was expressed as an index value calculated by the following equation. The larger index value of strength means the more excellent mechanical strength.

(Strength index)=(Breaking energy of each of the vulcanized compositions)/(Breaking energy of Comparative Example 1, 8, 15 or 16)×100

TABLE 1

Rubber compositions for base tread

| | Comparative Example 1 | Example 1 | Example 2 | Example 3 | Example 4 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| NR (1) | 70 | 70 | 70 | 70 | 70 | 70 | 70 | 70 | 70 | 70 | 70 |
| BR (1) (not modified) | — | — | — | — | — | 30 | 30 | 30 | 30 | 30 | 30 |
| BR (2) (modified) | 30 | 30 | 30 | 30 | 30 | — | — | — | — | — | — |
| Silica | 0 | 10 | 20 | 30 | 40 | 0 | 10 | 20 | 30 | 40 | 50 |
| Carbon black (1) | 50 | 40 | 30 | 20 | 10 | 50 | 40 | 30 | 20 | 10 | 0 |
| Silane coupling agent | — | 0.8 | 1.6 | 2.4 | 3.2 | — | 0.8 | 1.6 | 2.4 | 3.2 | 4 |
| Zinc oxide | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 |
| Antiaging agent | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 |
| Sulfur | 2 | 2 | 2 | 2 | 2 | 2 | 2 | 2 | 2 | 2 | 2 |
| Vulcanization accelerator (1) | 1.5 | 1.5 | 1.5 | 1.5 | 1.5 | 1.5 | 1.5 | 1.5 | 1.5 | 1.5 | 1.5 |
| Vulcanization accelerator (2) | — | 0.6 | 0.6 | 0.6 | 0.6 | — | 0.6 | 0.6 | 0.6 | 0.6 | 0.6 |
| Low-exothermic property | 100 | 103 | 106 | 109 | 112 | 95 | 97 | 97 | 101 | 103 | 105 |
| Breaking energy | 100 | 100 | 100 | 100 | 100 | 100 | 98 | 96 | 94 | 92 | 90 |

TABLE 2

Rubber compositions for sidewall

|  | Comparative Example 8 | Example 5 | Example 6 | Example 7 | Example 8 | Comparative Example 9 | Comparative Example 10 | Comparative Example 11 | Comparative Example 12 | Comparative Example 13 | Comparative Example 14 |
|---|---|---|---|---|---|---|---|---|---|---|---|
| NR (2) | 40 | 40 | 40 | 40 | 40 | 40 | 40 | 40 | 40 | 40 | 40 |
| BR (1) (not modified) | — | — | — | — | — | 60 | 60 | 60 | 60 | 60 | 60 |
| BR (2) (modified) | 60 | 60 | 60 | 60 | 60 | — | — | — | — | — | — |
| Silica | 0 | 10 | 20 | 30 | 40 | 0 | 10 | 20 | 30 | 40 | 50 |
| Carbon black (2) | 50 | 40 | 30 | 20 | 10 | 50 | 40 | 30 | 20 | 10 | 0 |
| Silane coupling agent | — | 0.8 | 1.6 | 2.4 | 3.2 | — | 0.8 | 1.6 | 2.4 | 3.2 | 4 |
| Zinc oxide | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 |
| Antiaging agent | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 |
| Aromatic oil | 5 | 5 | 5 | 5 | 5 | 5 | 5 | 5 | 5 | 5 | 5 |
| Sulfur | 1.5 | 1.5 | 1.5 | 1.5 | 1.5 | 1.5 | 1.5 | 1.5 | 1.5 | 1.5 | 1.5 |
| Vulcanization accelerator (1) | 0.7 | 0.7 | 0.7 | 0.7 | 0.7 | 0.7 | 0.7 | 0.7 | 0.7 | 0.7 | 0.7 |
| Vulcanization accelerator (2) | — | 0.6 | 0.6 | 0.6 | 0.6 | — | 0.6 | 0.6 | 0.6 | 0.6 | 0.6 |
| Low-exothermic property | 100 | 103 | 106 | 109 | 112 | 90 | 92 | 94 | 96 | 98 | 100 |
| Breaking energy | 100 | 100 | 100 | 100 | 100 | 100 | 98 | 96 | 94 | 92 | 90 |

TABLE 3

Rubber compositions for base tread

|  | Example 9 | Example 10 | Example 11 | Comparative Example 15 |
|---|---|---|---|---|
| NR(1) | 70 | 70 | 70 | 70 |
| BR(2) (modified) | 30 | 30 | 30 | 30 |
| Mixture | 2 | 5 | 5 | — |
| Silica | 20 | 20 | 30 | — |
| Carbon black (1) | 10 | 10 | 10 | 30 |
| Silane coupling agent | 1.6 | 1.6 | 2.4 | — |
| Zinc oxide | 3 | 3 | 3 | 3 |
| Stearic acid | 2 | 2 | 2 | 2 |
| Antiaging agent | 2 | 2 | 2 | 2 |
| Wax | 2 | 2 | 2 | 2 |
| Sulfur | 2 | 2 | 2 | 2 |
| Vulcanization accelerator (1) | 1.5 | 1.5 | 1.5 | 1.5 |
| Vulcanization accelerator (2) | 0.6 | 0.6 | 0.6 | — |
| Low-exothermic property | 105 | 110 | 106 | 100 |
| Breaking energy | 110 | 115 | 120 | 100 |

TABLE 4

Rubber compositions for sidewall

|  | Example 12 | Example 13 | Example 14 | Comparative Example 16 |
|---|---|---|---|---|
| NR(2) | 40 | 40 | 40 | 40 |
| BR(2) (modified) | 60 | 60 | 60 | 60 |
| Mixture | 2 | 5 | 5 | — |
| Silica | 20 | 20 | 30 | — |
| Carbon black (2) | 30 | 30 | 20 | 50 |
| Silane coupling agent | 1.6 | 1.6 | 2.4 | — |
| Zinc oxide | 3 | 3 | 3 | 3 |
| Stearic acid | 2 | 2 | 2 | 2 |
| Antiaging agent | 2 | 2 | 2 | 2 |
| Wax | 2 | 2 | 2 | 2 |
| Aromatic oil | 5 | 5 | 5 | 5 |
| Sulfur | 1.5 | 1.5 | 1.5 | 1.5 |
| Vulcanization accelerator (1) | 0.7 | 0.7 | 0.7 | 0.7 |
| Vulcanization accelerator (2) | 0.6 | 0.6 | 0.6 | — |
| Low-exothermic property | 110 | 115 | 120 | 100 |
| Breaking energy | 105 | 110 | 108 | 100 |

In Examples 1 to 8 in which the modified butadiene rubber and the silica were used together, the obtained rubber compositions showed high mechanical strength and excellent low-exothermic property. On the other hand, in Comparative Examples 2 to 7 and 9 to 14 in which the non-modified butadiene rubber was used instead of the modified butadiene rubber, the mechanical strengths decreased. There was also a tendency for the low-exothermic properties to deteriorate. Furthermore, in Comparative Examples 1 and 8 in which no silica was blended, the low-exothermic properties were at an insufficient level.

In Examples 9 to 14 in which the mixture was further added in addition to the modified butadiene rubber and the silica, the low-exothermic properties and the mechanical strengths were greatly improved, in comparison with those in Comparative Examples 15 and 16 in which the modified butadiene rubber was used without blending the silica and the mixture

The invention claimed is:
1. A rubber composition comprising:
   a rubber component;
   1 to 8 parts by mass of a mixture of a zinc salt of an aliphatic carboxylic acid and a zinc salt of an aromatic carboxylic acid per 100 parts by mass of the rubber component; and
   10 to 150 parts by mass of silica per 100 parts by mass of the rubber component, the rubber component consisting essentially of a natural rubber and a butadiene rubber, said butadiene rubber being modified by a compound represented by the formula (1):

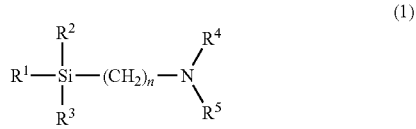

(1)

wherein $R^1$, $R^2$ and $R^3$ are the same or different and independently represent an alkyl group, an alkoxy group, a silyloxy group, an acetal group, a carboxyl group, a mercapto group, or a derivative thereof, and at least one of $R^1$, $R^2$ and $R^3$ independently represent an alkoxy group; $R^4$ and $R^5$ independently represent an ethyl group; and n represents an integer of 1 to 5.

2. The rubber composition according to claim 1, wherein a vinyl content in the modified butadiene rubber is 35% by mass or less.

3. The rubber composition according to claim 1, wherein the rubber composition is used as a rubber composition for a base tread or a sidewall.

4. A pneumatic tire produced using the rubber composition according to claim 1.

5. The rubber composition according to claim 1, wherein the vinyl content in the modified butadiene rubber is 20% by mass or less.

6. The rubber composition according to claim 1, wherein amount of the modified butadiene rubber in 100% by mass of the rubber content is 10 to 80% by mass, and the amount of natural rubber in 100% by mass of the rubber component is 20 to 90% by mass.

7. The rubber composition according to claim 1, wherein the average primary particle diameter of the silica is 10 nm or more.

8. The rubber composition according to claim 1, further comprising 10 to 60 parts by mass of carbon black per 100 parts by mass of the rubber component.

9. A pneumatic tire having a base tread and/or a sidewall produced using the rubber composition according to claim 1.

* * * * *